United States Patent [19]

Jones

[11] Patent Number: 4,970,349

[45] Date of Patent: Nov. 13, 1990

[54] SAFETY OUTLET COVER ASSEMBLY

[76] Inventor: Marcus C. Jones, 7009 Stoney Creek, Oklahoma City, Okla. 73132

[21] Appl. No.: 313,632

[22] Filed: Feb. 21, 1989

[51] Int. Cl.5 .............................................. H02G 3/14
[52] U.S. Cl. ...................................... 174/67; 439/142
[58] Field of Search ........................... 174/67; 220/242; 439/133, 135, 136, 142, 143, 145

[56] References Cited

U.S. PATENT DOCUMENTS 2,820,842  1/1958  Meistrell ................................. 174/67
2,988,242  6/1961  Kneip .................................... 220/242
3,068,442  12/1962  Kubik et al. ........................ 174/67 X Primary Examiner—Leo P. Picard
Assistant Examiner—David A. Tone
Attorney, Agent, or Firm—Bill D. McCarthy

[57] ABSTRACT

A safety outlet cover assembly is provided which prevents unauthorized access to a wall socket outlet. The safety outlet assembly comprises a housing, a plug insertion guard assembly disposable within the housing, and a key member for selectively engaging the plug insertion guard assembly to move the plug insertion guard assembly from a first position and a second position. In the first position the plug insertion guard assembly is in a blocking position relative to openings in the housing and thus the wall socket outlet; whereas, when the plug insertion guard assembly is in the second position, access to the wall socket outlet is unrestricted so that male components of an electrical plug can be inserted into female openings of a wall socket to complete the electrical circuit therebetween.

19 Claims, 3 Drawing Sheets

U.S. Patent    Nov. 13, 1990    Sheet 1 of 3    4,970,349
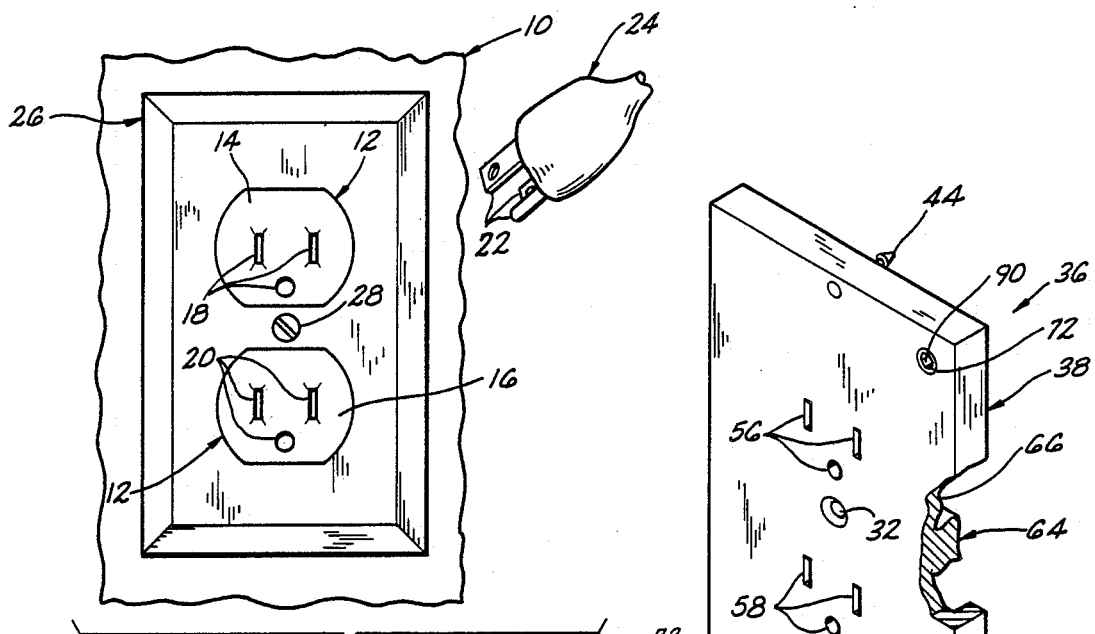
PRIOR ART  FIG. 1
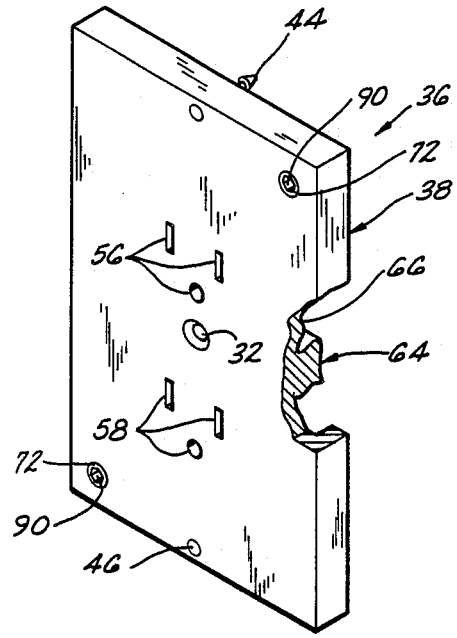
FIG. 4
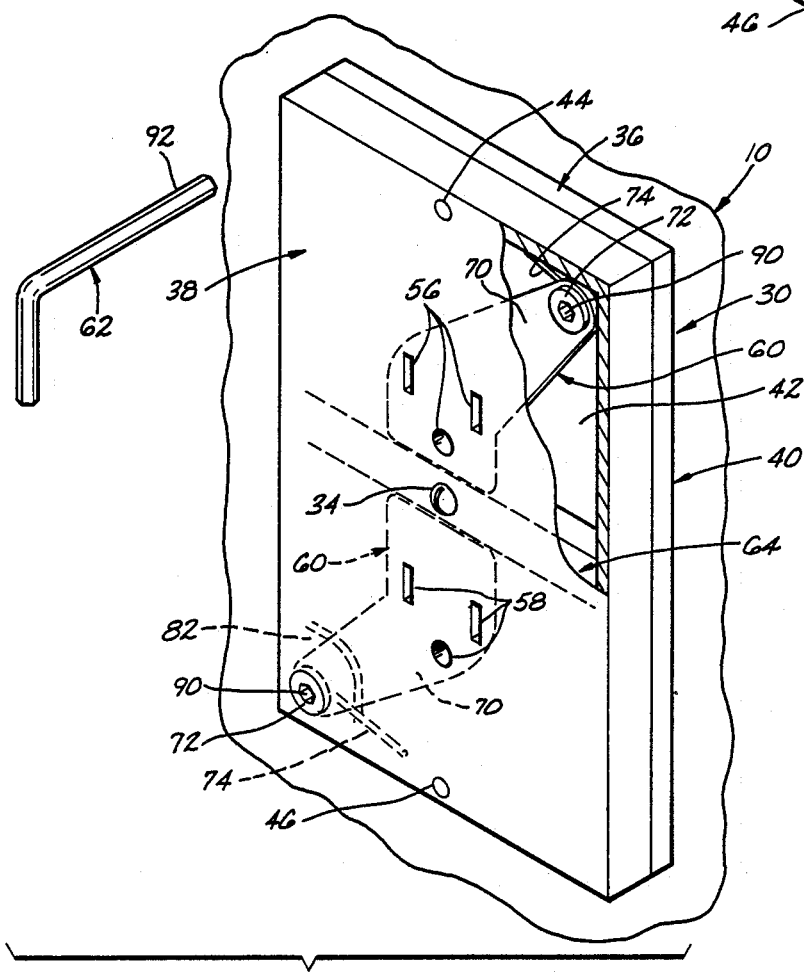
FIG. 2
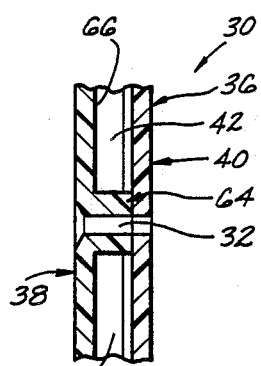
FIG. 3

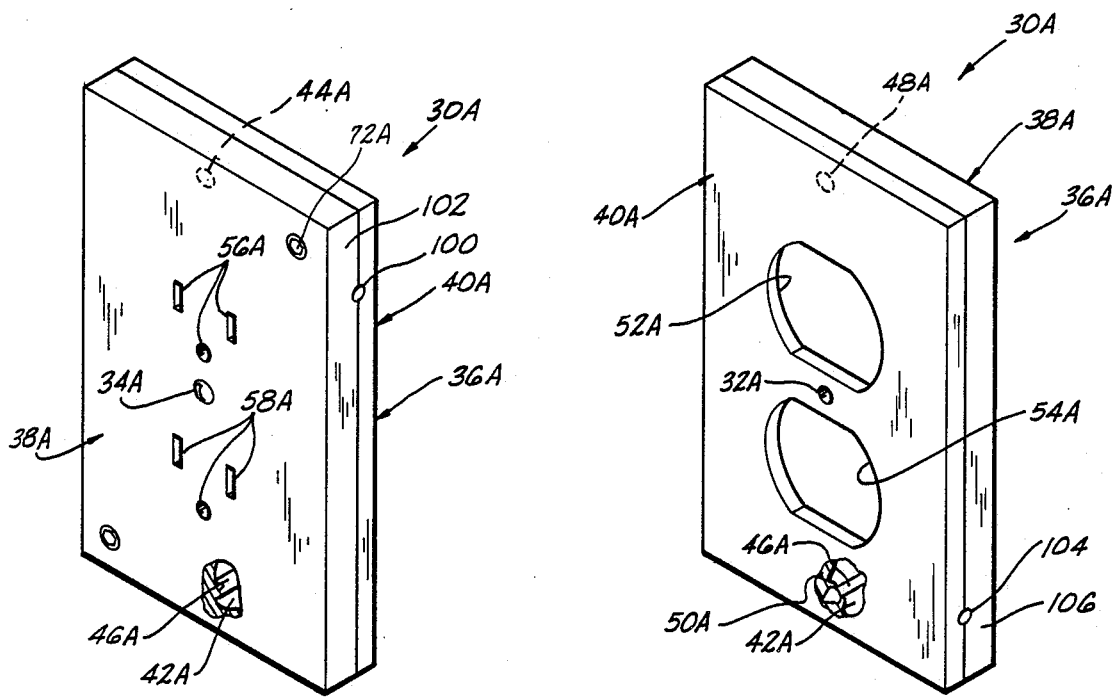
FIG. 8  FIG. 9
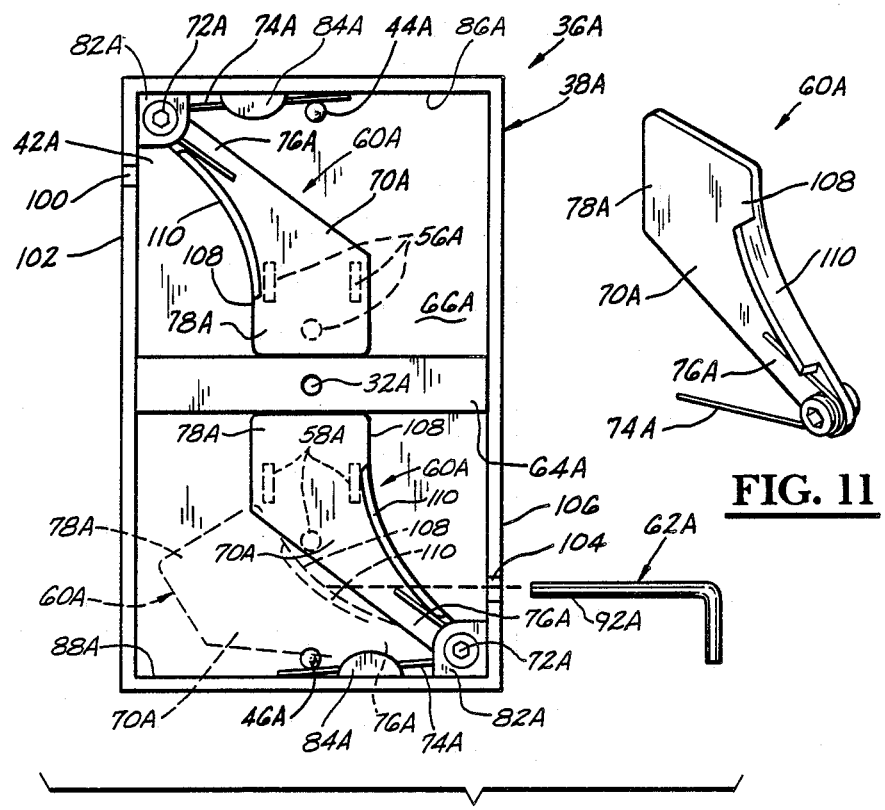
FIG. 11
FIG. 10

SAFETY OUTLET COVER ASSEMBLY

BACKGROUND OF THE INVENTION

1. Field of the Invention

The present invention relates to cover assemblies for wall socket outlets, and more particularly, but not by way of limitation, to a safety outlet cover assembly for preventing unauthorized access to a wall socket outlet.

2. Discussion of Prior Art

Because of the inquisitive nature of children, many children have received electrical shocks by inserting foreign objects into a wall socket outlet. As an aid in the prevention of shock by deterring small children from gaining access to wall socket outlets, safety outlet covers have heretofore been proposed. Typical of such prior art devices is the "Crib Pals" Safety Outlet Cover, manufactured by Lucky Star Enterprises & Co., Lit., No. 210 An Ho Road, Taipai, Taiwan. The before described safety outlet cover, which is employed as a replacement cover for a conventional wall plate, comprises a cover plate having a spring biased member containing a plurality of holes alignable with the female openings in the wall socket outlet when an electrical plug is disposed within the holes of the member and the member is caused to rotate approximately one-quarter of a turn. Thereafter, the plug can be inserted into the outlet. Such a cover assembly, while restricting direct access to the wall socket outlet, does not prevent or eliminate the possibility of a small child sticking an object into the holes of the biased member and rotating the biased member to a position so that the object can be brought into contact with the wall socket outlet.

While the prior art devices, such as the safety outlet cover described above, have met with some success, problems have nevertheless been encountered in that small children and other persons are still allowed to obtain unauthorized access to the wall socket outlet; that is, such persons can insert an object into the holes of the blocking member and with little effort rotate the blocking member to a position so that the object can be inserted into the wall socket outlet. Therefore, it would be highly desirable if one could construct a safety outlet cover assembly which would substantially eliminate or prevent unauthorized access to the wall socket outlet, while at the same time permitting authorized access to the wall socket outlet to be achieved with minimal effort.

SUMMARY OF THE INVENTION

According to the present invention a safety outlet cover assembly is provided which prevents unauthorized access to a wall socket outlet. Broadly, the safety outlet assembly comprises a housing, a plug insertion guard assembly disposable within the housing, and a key member for selectively engaging the plug insertion guard assembly to move the plug insertion guard assembly from a first or blocking position and a second or unrestricting position. That is, when the plug insertion guard assembly is disposed in the first position, the plug insertion guard assembly is in a blocking position relative to openings in the housing and thus the wall socket outlet; whereas, when the plug insertion guard assembly is disposed in the second position, access to the wall socket outlet is unrestricted so that male components of an electrical plug can be inserted into female openings of a wall socket to complete the electrical circuit therebetween.

The plug insertion guard assembly, which is disposed within a cavity in the housing, comprises a plate member, a connecting member for pivotally connecting the plate member to the housing, and a biasing spring for urging the plate member toward the first position. The housing is further provided with a key opening so that the key member, when positioned through the key opening, can selectively move the plate member from the first position to the second position.

An object of the present invention is to provide a safety cover assembly for a wall outlet socket.

Another object of the present invention, while achieving the before-stated object, is to provide a safety cover assembly for a wall outlet socket which does not interfere with the use of the wall socket but prevents unauthorized access to the wall socket by persons, such as children.

Yet another object of the present invention, while achieving the before-stated objects, is to provide a safety cover assembly for a wall outlet socket which is durable in construction, economical to manufacture, and which overcomes the disadvantages of the prior art devices.

Other objects, advantages and features of the present invention will be apparent to those skilled in the art from the following detailed description when read in conjunction with the drawings and the appended claims.

BRIEF DESCRIPTION OF THE DRAWINGS

FIG. 1 is a front elevational view of a wall socket outlet having a conventional cover plate connected thereto and illustrating a male plug of an electrical device for connection to the wall socket outlet.

FIG. 2 is a partially cutaway, isometric view of the wall socket outlet of FIG. 1 wherein the conventional cover plate has been removed and replaced with a safety outlet cover assembly constructed in accordance with the present invention.

FIG. 3 is a fragmental, cross-sectional view of a portion of the safety outlet cover assembly of FIG. 2 illustrating a support member and the formation of a cavity within a housing of the safety outlet cover assembly.

FIG. 4 is a partially cutaway, isometric view of a forward side portion of the safety outlet cover assembly of the present invention.

FIG. 8 is a partially cutaway, isometric view of a second embodiment of a safety outlet cover assembly constructed in accordance with the present invention wherein a housing of the safety outlet cover assembly is provided with a key opening in one edge thereof.

FIG. 9 is a partially cutaway, isometric view of an opposite side of the housing showing a key opening in an opposed edge thereof.

FIG. 10 is an elevational view of the interior of the forward side portion of the safety outlet cover assembly of FIG. 8 illustrating a key member positionable through one key opening in the housing for contact with and selectively moving a plug insertion guard member from a first blocking position to a second position such that an electrical plug can be connected to a wall socket outlet.

FIG. 11 is an isometric view of the plug insertion guard member of the plug insertion guard assemblies of the safety outlet cover assembly of FIG. 10.

DETAILED DESCRIPTION

Figure 5:
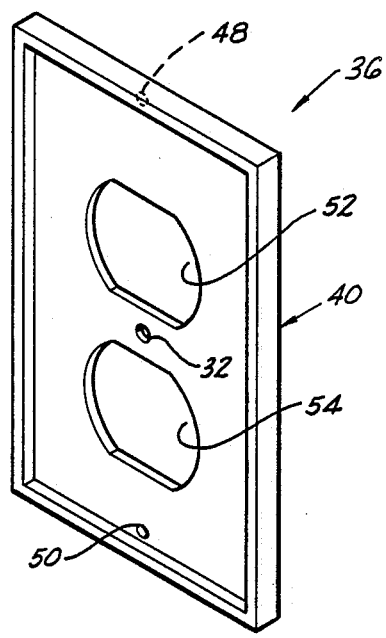
FIG. 5 is an isometric, interior view of a rearward side portion of the safety outlet cover assembly of FIG. 2.

Referring now to the drawings and more particularly to FIG. 1, a portion of a wall 10 is shown having a wall socket outlet 12 disposed therein in a conventional manner. The wall socket outlet 12 is illustrated as having two female connector members 14 and 16. The female connector members 14 and 16 are provided with female openings 18 and 20, respectively; and the female openings 18 and 20 are adapted to receive male components 22 of an electrical plug 24. The wall socket outlet 12 is further provided with a threaded bore (not shown) so that a conventional cover plate 26 can be secured to the wall socket outlet 12 by a screw 28.

The wall socket outlet 12 and the cover plate 26 are conventional components; and the attachment of the cover plate 26 to the wall socket outlet 12 via the screw 28 is carried out in the customary manner. Thus, no further description of such components or the connection of the cover plate 26 to the wall socket outlet 26 is believed necessary to enable one to fully comprehend and understand Applicant's invention which will now be described in detail.

Referring now to FIGS. 2-5, the conventional cover plate 26 connected to the wall socket outlet 12 (as illustrated in FIG. 1) has been replaced with a safety outlet cover assembly 30 constructed in accordance with the present invention. The safety outlet cover assembly 30 can be connected to the wall socket outlet 12 in a manner similar to the conventional cover plate 26. That is, the safety outlet cover assembly 30 is provided with a bore 32 (FIGS. 3-6) which is alignable with the threaded bore (not shown) of the wall socket outlet 12 so that the safety outlet cover assembly 30 can be secured to the wall socket outlet 12 with a screw 34 in the same manner as the conventional cover plate 26 is secured to the wall socket outlet 12 with the screw 28.

The safety outlet cover assembly 30 comprises a housing 36 having a forward side portion 38 and a spatially disposed rearward side portion 40. The forward side portion 38 and the rearward side portion 40, which cooperate to define a cavity 42 in the housing 36, can be secured together by any suitable means. For example, the forward side portion 38 can be provided with a plurality of male members, such as male members 44 and 46 (FIGS. 4 and 6) which are adapted to matingly engage female members on the rearward side portion 40, such as female members 48 and 50 (FIG. 5).

As illustrated in FIG. 5, the rearward side portion 40 is also provided with spatially disposed openings 52 and 54. The number of openings formed in the rearward side portion 40 correspond to the number of female connector members of the wall socket outlet 12. That is, when the wall socket outlet 12 is provided with two female connector members, such as female connector members 14 and 16, the rearward side portion 40 is provided with two openings, such as opening 52 and 54. Thus, when the safety outlet cover assembly 30 is connected to the wall outlet socket 12, the female connector members 14 and 16 are disposed in the openings 52 and 54, respectively, of the rearward side portion 40.

The forward side portion 38 is also provided with a number of sets of plug insertion openings corresponding to the number of openings in the rearward side portion 40. That is, when the rearward side portion 40 is provided with openings 52 and 54 the forward side portion 38 is provided with two sets of plug insertion openings 56 and 58. The sets of plug insertion openings 56 and 58 are disposed in the forward portion 38 so as to be alignable with the openings 52 and 54 of the rearward side portion 40, and thus to the female openings 18 and 20 of the wall socket outlet 12, when the safety outlet cover assembly 30 is connected to the wall socket 12.

To prevent children and other persons from gaining unauthorized access to the wall outlet socket 12, and to prevent such persons from inserting objects into the female openings 18 and 20 of the wall socket outlet 12 (which may result in an electrical shock to the person), the safety cover outlet assembly 30 further comprises a plug insertion guard assembly 60 and a key element or member 62. The plug insertion guard assembly 60 is disposed within the cavity 42 of the housing 36 and pivotally connected to the forward side portion 38 of the housing 36. Further, the plug insertion guard assembly 60 is biased in a first or blocking position relative to the plug insertion openings 56 and 58 formed in the forward side portion 38 of the housing 36 such that the plug insertion guard assembly 60 is selectively movable between a first or blocking position and a second or non-blocking position relative to the plug insertion openings formed in the forward side portion 38 of the housing 36, such as the plug insertion openings 56 and 58. The plug insertion guard assembly 60 is biased in the first position so as to prevent unauthorized access to the female openings 18 and 20 of the wall socket outlet 12.

The number of plug insertion guard assemblies 60 utilized in the safety outlet cover assembly 30 will vary depending upon the number of sets of plug insertion openings formed in the forward side portion 38 of the housing 36, as well as the number of female connector members (and thus female openings) present in the wall socket outlet 12. For example, when the wall socket outlet 12 contains two female connector members (such as female connector members 14 and 16), two plug insertion guard assemblies 60 are employed in the construction of the safety outlet cover assembly 30.

The safety outlet cover assembly 30 illustrated utilizes two plug insertion guard assemblies 60. Since the two plug insertion guard assemblies 60 are identical in both construction and operation, the components of the two plug insertion guard assemblies 60 will be identified by the same numerals; and where required for reasons of clarity, such plug insertion guard assemblies 60 or components thereof will be referred to as the upper disposed plug insertion guard assembly (or component) or the lower disposed plug insertion guard assembly (or component).

Figure 6:
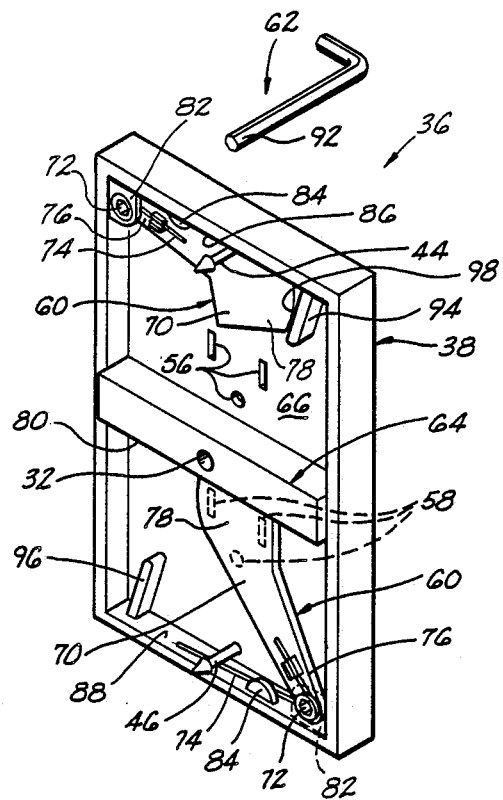
FIG. 6 is an isometric, interior view of the forward side portion of the safety outlet cover assembly of FIG. 2 wherein one plug insert guard member of a plug insertion guard assembly is in a first or blocking position and a second plug insert guard member of a second plug insertion guard assembly is in a second or non-blocking position relative to the female openings of the wall socket outlet.

Referring now to FIG. 6, two plug insertion guard assemblies 60 are illustrated pivotally connected to the forward side portion 38 of the housing 36. The plug insertion guard assemblies 60 are operable independent of each other. Thus, the lower disposed plug insertion guard assembly 60 is illustrated as biased in the first position so that the plug insertion guard assembly 60 is in a blocking position relative to the plug insertion openings 58; and the upper disposed plug insertion guard assembly 60 is illustrated in a second position so that the plug insertion openings 56 disposed within the forward side portion 38 of the housing 36 are unrestricted and adapted to receive the male components 22 of the electrical plug 24. That is, one of the plug insertion guard assemblies 60 (the upper disposed plug insertion guard assembly) has been selectively moved to the second or non-blocking position by the key member 62; and the plug insertion guard assembly 60 (the lower disposed plug insertion guard assembly) is biased in the first or blocking position so that the plug insertion guard assembly 60 is disposed between the plug insertion openings 58 (shown in phantom) of the housing 36 and the female connector member 16 of the wall socket outlet 12. Thus, when the lower disposed plug insertion guard assembly 60 is in the biased first position an object cannot be inserted into the female openings of the female connector members, such as the female opening 20 of the female connector member 16, until such time as the lower disposed plug insertion guard assembly 60 has been selectively moved to the second position by the key member 62.

To maintain the forward side portion 38 and the rearward side portion 40 of the housing 36 in the desired spatial relation, and thus permit the plug insertion guard assemblies 60 to be moved between the first and second positions in the cavity 42, the safety outlet cover assembly 30 is further provided with a support member 64. The support member 64 is disposed on an interior side 66 of the forward side portion 38 such that the support member 64 extends transverse to the elongated axis of the forward side portion 38 substantially as shown in FIG. 6. The support member 64, in addition to functioning as a support and spacer for the housing 36, also functions as a support or guide member for the plug insertion guard assemblies 60 when same are in the first, blocking position.

The bore 32, which is adapted to receive the screw 34, extends through the forward side portion 38, the support member 64 and the rearward side portion 40; and the bore 32 is alignable with the threaded bore (not shown) in the wall socket outlet 12. Thus, the housing 36 of the safety outlet cover assembly 30 can be secured to the wall socket outlet 12 via the screw 34 in a conventional manner.

Figure 7:
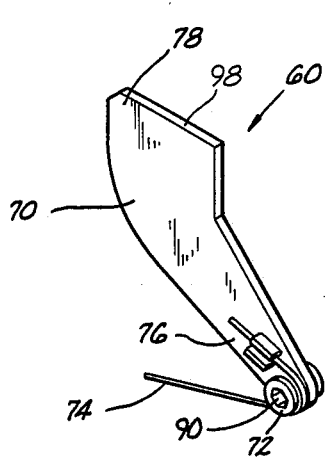
FIG. 7 is an isometric view of the plug insertion guard member of the plug insertion guard assembly of the safety outlet cover assembly of FIG. 6.

Referring now to FIGS. 6 and 7, the plug insertion guard assembly 60 will be more fully described. As previously stated, the number of plug insertion guard assemblies 60 utilized in the safety outlet cover assembly 30 will be dependent upon the number of female connector members in the wall socket outlet 12. That is, when the wall socket outlet 12 contains two female connector members, such as the female connector members 14 and 16, two plug insertion guard assemblies 60 are incorporated into the safety outlet cover assembly 30 so that each of the female connector members 14 and 16 of the wall socket outlet 12 will normally be blocked or closed off by one of the plug insertion guard assemblies 60.

Each of the plug insertion guard assemblies 60 comprise a plate member 70, a connecting member 72 for pivotally connecting the plate member 70 to the housing 36, and a spring member 74 for biasing the plate member 70 in the first or blocking position. The plate member 70, a substantially planar member, is characterized as having a first end 76 and a second end 78. The first end 76 is pivotally connected to the housing 36 by the connecting member 72, such as a pivot pin, so that when the plate member 70 is in the biased first position the second end 78 slideably engages an adjacently disposed edge of the support member 64, such as edge 80, and the plate member 70 is disposed adjacent and in a blocking position relative to the plug insertion openings 58 formed in the forward side portion 38 of the housing 36 substantially as shown.

The geometric configuration of the plate member 70 is such that when the plate member 70 is moved to the second position the plate member 70 does not interfere with the insertion of the male components 22 of the electrical plug 24 into the plug insertion openings 48, and thus the female openings 20 in the female connector member 14 of the wall socket outlet 12.

The spring member 74, which biases the plate member 70 in the first or blocking position, is connected to the first end 76 of the plate member 70. Any suitable member can be employed as the spring member 74 which is capable of urging the plate member 70 toward the first position, while permitting the plate member 70 to be moved to the second position by the key member 62.

To achieve the desired pivotal attachment of the first end 76 of the plate member 70 to the forward side portion 38, as well as to enhance the stability of the spring member 74 and the plate member 70 as the plate member 70 is moved between the first position and the second position, the forward side portion is provided with an ear or tab member 82. The ear 82, which is provided with a bore (not shown) extending therethrough, is spatially disposed from the interior side 66 of the forward side portion 38 so as to define a recess into which the first end 76 of the plate member 70 can be positioned. Thus, the plate member 70 can be pivotally attached to the forward side portion 38 and the ear 82 via its first end 76 by the connecting member 72. The ear 82 also assists in stabilizing the spring member 74 which is connected to the first end 76 of the plate member 70.

To further stabilize the spring member 74, a spring retainer member 84 is disposed along a portion of edges 86 and 88 of the interior side 66 of the forward side portion 38. The spring retainer member 84 and the adjacently disposed interior side 66 of the forward side portion 38 cooperate to define a retainer track for one end portion of the spring member 74.

To effect movement of the plate member 70 from the first position to the second position, the connecting member 72 (which extends through aligned apertures, not shown, in the forward side portion 38 of the housing 36 and the ear 82) is provided with a key opening 90 in an outwardly extending end portion thereof. The key opening 90 is configured to matingly receive one end 92 of the key member 62. Thus, to move the plate member 70 to the second position so that the plug insertion openings 58 in the forward side portion 38 of the housing 36 are unrestricted by the plate member 70, the end 92 of the key member 62 is inserted into the key opening 90 and the key member 62 is turned in a clockwise direction until the plate member 70 has been moved to the second position and the plug insertion openings 58 are in an open, unrestricted condition. Thereafter, while maintaining the plate member 70 in the second position, the male components 22 of the electrical plug 24 can be inserted through the plug insertion openings 58 in the forward side portion 38 of the housing 36 and into contact with the female openings 20 in the female connector member 16.

To stabilize the plate member 70 in the second position while the male components 22 of the electrical plug 24 are positioned through the plug insertion openings 58 and into contact with the female openings 20 of the female connector member 16, the safety outlet cover assembly 30 is further provided with rib members 94 and 96 disposed along the interior side 68 of the forward side portion 38 substantially as shown in FIG. 6. The rib members 94 and 96, which extend from the edges 86 and 88, respectively, of the forward side portion 38, are adapted to frictionally engage the second end 78 of the plate member 70 when the plate member 70 is moved to the second position by the key member 62. That is, when the key member 62 is positioned in the key opening 90 of the connecting member 72 and turned in a clockwise direction the turning of the key member 62 causes the plate member 70 to be moved to the second position such that an edge 98 of the second end 78 of the plate member 70 frictionally engages and is secured in the second position by one of the rib members, such as the rib member 94.

The frictional engagement of the plate member 70 with the rib member 94 secures the plate member 70 in the second position so that one can insert the male components 22 of the electrical plug 24 through the unrestricted plug insertion openings 56 in the forward side portion 38 of the housing 36. When the male components 22 of the electrical plug 24 have been inserted into the plug insertion openings 56, a counterclockwise motion is imparted to the key member 62 for disengaging the plate member 70 from the rib member 94. Thus, when the electrical plug 24 is removed from the wall socket outlet 12 and the plug insertion openings 56 in the forward side portion 38, the plate member 70 returns to the first position due to the biasing action thereon of the spring member 74.

Referring now to FIGS. 8–11, a second embodiment of a safety outlet cover assembly 30A of the present invention is illustrated. The safety outlet cover assembly 30A comprises a housing 36A having a forward side portion 38A and a spatially disposed rearward side portion 40A. A bore 32A, which is adapted to receive a screw 34A, extends through the housing 36A so as to be alignable with a threaded bore (not shown) in the wall outlet socket.

The forward side portion 38A and the rearward side portion 40A, which cooperate to define a cavity 42A in the housing 36A, can be secured together by any suitable means. For example, the forward side portion 38A can be provided with a plurality of male members, such as male members 44A and 46A, which are adapted to matingly engage female members on the rearward side portion 40, such as female members 48A and 50A (FIG. 9).

The rearward side portion 40A of the housing 36A is provided with at least one opening therein for matingly receiving the wall socket outlet 12. The number of openings formed in the rearward side portion 40A corresponds to the number of female connector members of the wall socket outlet 12. That is, when the wall socket outlet 12 is provided with two female connector members the rearward side portion 40A will have two openings therein, such as openings 52A and 54A.

The forward side portion 38A is also provided with a number of sets of plug insertion openings corresponding to the number of openings in the rearward side portion 40A. Thus, when the rearward side portion 40A is provided with openings 52A and 54A the forward side portion 38A is provided with plug insertion openings 56A and 58A. The sets of plug openings 56A and 58A are disposed in the forward side portion 38A so as to be alignable with the openings 52A and 54A of the rearward side portion 40A, and thus with the female openings of the wall socket outlet, when the safety outlet cover assembly 30 is connected to the wall socket.

To prevent children and other persons from gaining unauthorized access to the wall outlet socket, and to prevent such persons from inserting objects into the female openings of the wall socket outlet (which may result in an electrical shock to the person) the safety cover outlet assembly 30A further comprises a plug insertion guard assembly 60A and a key element or member 62A. The plug insertion guard assembly 60A is disposed within the cavity 42A of the housing 36A and pivotally connected to the forward side portion 38A of the housing 36A. Further, the plug insertion guard assembly 60A is biased in a first or blocking position relative to the plug insertion openings 56A and 58A formed in the forward side portion 38A of the housing 36A such that the plug insertion guard assembly 60A is selectively movable between a first or blocking position and a second or non-blocking position relative to the plug insertion openings 56A and 58A. The plug insertion guard assembly 60A is biased in the first position so as to prevent unauthorized access to the female openings of the wall socket outlet.

The number of plug insertion guard assemblies 60A utilized in the safety outlet cover assembly 30A will vary depending upon the number of sets of plug insertion openings formed in the forward side portion 38A of the housing 36A, as well as the number of female connector members (and thus female openings) present in the wall socket outlet. For example, when the wall socket outlet contains two female connector members the safety outlet cover assembly 30A will have two plug insertion guard assemblies 60A.

The safety outlet cover assembly 30A illustrated utilizes two plug insertion guard assemblies 60A. Because the two plug insertion guard assemblies 60A are identical in construction and operation, the components of the two plug insertion guard assemblies 60A will be identified by the same numerals; and where required for reasons of clarity, such plug insertion guard assemblies 60A or components thereof will be referred to as the upper disposed plug insertion guard assembly 60A (or component) or the lower disposed plug insertion guard assembly 60A (or component).

Referring now to FIG. 10, two plug insertion guard assemblies 60A are illustrated pivotally connected to the forward side portion 38A of the housing 36A. The plug insertion guard assemblies 60A are operable independent of each other. Thus, the upper disposed plug insertion guard assembly 60A is illustrated as biased in the first position so that the upper disposed plug insertion guard assembly 60A is in a blocking position relative to the plug insertion openings 58A; and the lower disposed plug insertion guard assembly 60A is illustrated by phantom lines in a second position so that the plug insertion openings 58A in the forward side portion 38A of the housing 36A are unrestricted and adapted to receive the male components of an electrical plug.

That is, one of the plug insertion guard assemblies 60A (the lower disposed plug insertion guard assembly) which is illustrated by solid lines in the biased first position, will be disposed in the second position (as represented by phantom lines) by the key member 62A so that the lower disposed insertion guard assembly 60A will be in a non-blocking position relative to the plug insertion openings 58A; and the other plug insertion guard assembly 60A (the upper disposed plug insertion guard assembly) is biased in the first or blocking position so that the upper disposed plug insertion guard assembly 60A is disposed between the plug insertion openings 56A (shown in phantom) of the housing 36A and the female connector member of the wall socket outlet. Thus, when the plug insertion guard assemblies 60A are in the biased first position an object cannot be inserted into the female openings of the female connector member until such time as one of the plug insertion guard assemblies 60A has been selectively moved to the second position by the key member 62A.

In order to maintain the forward side portion 38A and the rearward side portion 40A of the housing 36A in the desired spatial relation, and thus permit the plug insertion guard assemblies 60A to be moved between the first and second positions in the cavity 42A, the safety outlet cover assembly 30A is further provided with a support member 64A. The support member 64A is disposed on an interior side 66A of the forward side portion 38A such that the support member 64A extends transverse to the elongated axis of the forward side portion 38A substantially as shown in FIG. 10. The support member 64A, in addition to functioning as a support and spacer for the housing 36A, also functions as a support or guide member for the plug insertion guard assemblies 60A when same are in the first, blocking position.

The bore 32A, which is adapted to receive the screw 34A, extends through the forward side portion 38A, the support member 64A and the rearward side portion 40A; and the bore 32A is alignable with the threaded bore (not shown) in the wall socket outlet. Thus, the housing 36A of the safety outlet cover assembly 30A can be secured to the wall socket outlet via the screw 34A in a conventional manner.

Referring now to FIGS. 10 and 11, the plug insertion guard assemblies 60A will be more fully described. As previously stated, the number of plug insertion guard assemblies 60A utilized in the safety outlet cover assembly 30A will be dependent upon the number of female connector members in the wall socket outlet. That is, when the wall socket outlet contains two female connector members, the safety outlet cover assembly 30A is provided with two plug insertion guard assemblies 60A so that each of the female connector members of the wall socket outlet will normally be blocked or closed off by one of the plug insertion guard assemblies 60A.

Each of the plug insertion guard assemblies 60A comprise a plate member 70A, a connecting member 72A for pivotally connecting the plate member 70A to the forward side portion 38A of the housing 36A, and a spring member 74A for biasing the plate member 70A in the first or blocking position. The plate member 70A, a substantially planar member, is characterized as having a first end 76A and a second end 78A. The first end 76A is pivotally connected to the housing 36A by the connecting member 72A, such as a pivot pin, so that when the plate member 70A is in the biased first position the second end 78A slideably engages an adjacently disposed edge of the support member 64A. In the biased first position the plate member 70A is disposed adjacent and in a blocking position relative to the plug insertion openings 56A and 58A formed in the forward side portion 38A of the housing 36A substantially as shown in FIG. 10.

The geometric configuration of the plate member 70A is such that when the plate member 70A is moved to the second position, (i.e. the position of the lower disposed plate member 70A illustrated by phantom lines), the plate member 70A does not interfere with the insertion of the male components of the electrical plug into the plug insertion openings 58A, and thus the female openings in the female connector member of the wall socket outlet.

The spring member 74A, which biases the plate member 70A in the first or blocking position, is connected to the first end 76A of the plate member 70A. Any suitable member can be employed as the spring member 74A which is capable of urging the plate member 70A toward the first position, while permitting the plate member 70A to be moved to the second position by a key member 62A.

To achieve the desired pivotal attachment of the first end 76A of the plate member 70A to the forward side portion 38A, as well as to enhance the stability of the spring member 74A and the plate member 70A as the plate member 70A is moved between the first and the second positions, the forward side portion is provided with an ear or tab member 82A. The ear 82A, which is provided with a bore (not shown) extending therethrough, is spatially disposed from the interior side 66A of the forward side portion 38A so as to define a recess into which the first end 76A of the plate member 70A can be positioned. Thus, the plate member 70A can be pivotally attached to the forward side portion 38A and the ear 82A via its first end 76A by the connecting member 72A. The ear 82A also assists in stabilizing the spring member 74A which is connected to the first end 76A of the plate member 70A.

To further stabilize the spring member 74A, a spring retainer member 84A is disposed along a portion of edges 86A and 88A of the interior side 66A of the forward side portion 38A. The spring retainer member 84A and the adjacently disposed interior side 66A of the forward side portion 38A cooperate to define a retainer track for one end portion of the spring member 74A.

To effect movement of the plate member 70A from the first position to the second position, the housing 36A is provided with a key opening 100 in one edge 102 thereof, and a key opening 104 in an opposite edge 106 thereof substantially as shown. The key opening 104, which is configured to receive the key member 62A, is disposed through edge 106 of the housing 36A such that the key opening 104 is aligned with the plate member 70A of the lower disposed plug insertion guard assembly 60A. Thus, by inserting the key member 62A into the key opening 104 and into contact with the plate member 70A, application of an inwardly directed force on the key member 62A will cause the plate member 70A to be moved to the second position (illustrated in phantom lines) as the abutting end 92A of the key member 62A engages and slidingly moves along an adjacently disposed edge 108 of the plate member 70A. When the plate member 70A has been moved to the second position, and while maintaining the desired force on the key member 62A to maintain the plate member 70A in the second position, the male components of the electrical plug can be inserted through the plug insertion opening 58A and the housing 36A and into contact with the female openings of the female connector member. Thereafter, the key member 62A can be withdrawn from the key opening 104 and thus engagement with the plate member 70A.

Similarly, the key opening 100, which is also configured to receive the key member 62A, is disposed through edge 102 of the housing 36A such that the key opening 100 is aligned with the plate member 70A of the upper disposed plug insertion guard assembly 60A. Thus, by inserting the key member 62A into the key opening 100 and into contact with the plate member 70A, application of an inwardly directed force on the key member 62A will cause the plate member 70A to be moved to the second position as the abutting end of the key member 62A slidingly moves along the adjacently disposed edge 108 of the plate member 70A.

To insure that the desired contact is maintained between the key member 62A and the plate member 70A of the plug insertion guard assembly 60A when moving the plate member 70A to the second position, the plug insertion guard assembly 60A further comprises a key guide member 110 extending along the edge 108 of the plate member 70A. The key guide member 110, which extends from the plate member 70A so as to be substantially normally disposed relative to the plane of the plate member 70A, is provided with a length effective to permit travel of the key member 62A therealong when the key member 62A is disposed through one of the key openings 100, 104 and an inwardly directed force is applied to the key member 62A to move the plate member, such as the lower disposed plate member 70A, to the second position. When the plate member 70A has been moved to the second position, and while maintaining the desired force on the key member 62A to maintain the plate member 70A in the second position, the male components of the electrical plug can be inserted through the plug insertion openings 58A and into contact with the female openings of the female connector member. When the male components of the electrical plug is removed from the wall socket outlet, and thus the plug insertion openings 58A, the plate member 70A is caused to return to the first position by the spring member 74A.

The safety outlet cover assemblies 30 and 30A of the present invention can be fabricated of any suitable material, such as plastic. Further, the safety outlet cover assemblies 30 and 30A are each adapted to carry out the objects and attain the ends and advantages mentioned as well as those inherent therein. It will be understood that numerous changes may be made which will readily suggest themselves to those skilled in the art which are encompassed within the spirit of the invention and as defined in the appended claims.

What is claimed is:

1. A safety outlet cover assembly to prevent unauthorized access to a wall socket outlet having female openings therein adapted to receive male components of an electrical plug, the safety outlet cover assembly comprising:

a housing having a forward side portion, a spatially disposed rearward side portion, the forward side portion and rearward side portion defining a cavity therebetween, the rearward side having an opening therein adapted to receive the wall socket outlet, the forward side portion having a set of plug insertion openings therein alignable with and corresponding to female openings of the wall socket outlet; and, a plug insertion guard assembly disposed within the cavity of the housing, the plug insertion guard assembly biased in a first position wherein the plug insertion guard assembly is in a blocking position relative to the plug insertion openings in the forward side of the housing, the plug insertion guard assembly selectively movable to a second position wherein the plug insertion openings in the forward side of the housing are unrestricted and adapted to receive the male components of the electrical plug.

2. The safety outlet cover assembly of claim 1 wherein the plug insertion guard assembly comprises:
a plate member;
connecting means for pivotally connecting the plate member to the housing; and
biasing means for biasing the plate member in the first position.

3. The safety outlet cover assembly of claim 2 wherein the housing is provided with a key opening adapted to receive a key member such that the plate member can be selectively moved to the second position by the key member.

4. The safety outlet cover assembly of claim 3 wherein the wall socket outlet is provided with a threaded aperture, and wherein the safety outlet cover assembly further comprises:
a support member disposed within the cavity of the housing for maintaining the forward side portion and the rearward side portion of the housing in a desired stabilized spatial relation, the support member, forward side portion and rearward side portion of the housing having a bore extending therethrough alignable with a threaded aperture in the wall socket outlet, the bore adapted to receive a screw for threadably engaging the threaded aperture in the wall socket outlet so that the housing can be connected to the wall socket outlet.

5. The safety outlet cover assembly of claim 3 wherein the key opening is formed as an integral portion of the connecting means.

6. The safety outlet cover assembly of claim 5 wherein the wall socket outlet is provided with a threaded aperture, and wherein the safety outlet cover assembly further comprises:
a support member disposed within the cavity of the housing for maintaining the forward side portion and the rearward side portion of the housing in a desired stabilized spatial relation, the support member, forward side portion and rearward side portion of the housing having a bore extending therethrough alignable with a threaded aperture in the wall socket outlet for permitting the housing to be connected to the wall socket outlet.

7. The safety outlet cover assembly of claim 5 further comprising rib means disposed within the cavity of the housing for frictionally engaging the plate member when the plate member is in the second position and stabilizing the plate member in the second position until the plate member is selectively disengaged therefrom.

8. The safety outlet cover assembly of claim 3 wherein the key opening extends through an edge of the housing and communicates with the cavity formed therein, and wherein the plate member is provided with a key guide member extending along an edge thereof disposed adjacent the key opening in the housing when the plate member is in the first position, the key guide member having an effective length such that when the key member is positioned with the key opening, the key member travels along the key guide member to selectively move the plate member to the second position.

9. The safety outlet cover assembly of claim 8 wherein the wall socket outlet is provided with a threaded aperture, and wherein the safety outlet cover assembly further comprises:

a support member disposed within the cavity of the housing for maintaining the forward side portion and the rearward side portion of the housing in a desired stabilized spatial relation, the support member, forward side portion and rearward side portion of the housing having a bore extending therethrough alignable with a threaded aperture in the wall socket outlet for permitting the housing to be connected to the wall socket outlet.

10. A safety outlet cover assembly to prevent unauthorized access to a wall socket outlet having female openings therein adapted to receive male components of an electrical plug, the safety outlet cover assembly comprising:

a housing having a forward side portion, a spatially disposed rearward side portion, the forward side portion and rearward side portion defining a cavity therebetween, the rearward side having an opening therein adapted to receive the wall socket outlet, the forward side portion having a set of plug insertion openings therein alignable with and corresponding to female openings of the wall socket outlet; and a plug insertion guard assembly disposed within the cavity of the housing, the plug insertion guard assembly selectively movable between a first position and a second position, in the first position the plug insertion guard assembly being disposed between the plug insertion openings of the forward side of the housing and the female openings in the wall socket outlet, in the second position the plug insertion guard assembly being displaced within the cavity such that the plug insertion openings are unrestricted and the female openings in the wall socket are adapted to receive the male components of the electrical plug.

11. The safety outlet cover assembly of claim 10 wherein the plug insertion guard assembly comprises:

a plate member disposable within the cavity of the housing; and connecting means for pivotally connecting the plate member to the housing.

12. The safety outlet cover assembly of claim 11 wherein the housing is provided with a key opening adapted to receive a key member such that the plate member is selectively moved to the second position by the key member disposed within the key opening.

13. The safety outlet cover assembly of claim 12 further comprising rib means disposed within the cavity of the housing for frictionally engaging the plate member when the plate member is in the second position and for stabilizing the plate member in the second position.

14. The safety outlet cover assembly of claim 13 wherein the key opening is formed as an integral portion of the connecting means.

15. The safety outlet cover assembly of claim 14 wherein the plug insertion guard assembly further comprises biasing means for urging the plate member toward the first position.

16. The safety outlet cover assembly of claim 15 wherein the wall socket outlet is provided with a threaded aperture, and wherein the safety outlet cover assembly further comprises:

a support member disposed within the cavity of the housing for maintaining the forward side portion and the rearward side portion of the housing in a desired stabilized spatial relation, the support member, forward side portion and rearward side portion of the housing having a bore extending therethrough alignable with a threaded aperture in the wall socket outlet for permitting the housing to be connected to the wall socket outlet.

17. The safety outlet cover assembly of claim 10 wherein the housing is provided with a key opening communicating with the cavity, and wherein the plug insertion guard assembly further comprises:

a plate member;

connecting means for pivotally connecting the plate member to the housing; and biasing means for urging the plate member toward the first position.

18. The safety outlet cover assembly of claim 17 wherein the key opening, is adapted to receive a key member such that the plate member is selectively movable between the first and the second position by the key member.

19. The safety outlet cover assembly of claim 18 wherein the key opening extends through an edge of the housing and communicates with the cavity formed therein, and wherein the plate member is provided with a key guide member extending along an edge thereof disposed adjacent the key opening the housing when the plate member is in the first position, the key guide member having an effective length such that when the key member is positioned within the key opening, the key member can be caused to travel along the key guide member and produce an inwardly directed force to selectively move the plate member to the second position.

* * * * *